United States Patent Office 3,041,364
Patented June 26, 1962

3,041,364
PROCESS OF PREPARING 4,4'-DIISOCYANATODIPHENYL SULFIDES

Herbert F. McShane, Jr., and John J. Verbanc, Wilmington, Del., assignors to E. I. du Pont de Nemours and Company, Wilmington, Del., a corporation of Delaware
No Drawing. Filed Dec. 18, 1959, Ser. No. 860,353
3 Claims. (Cl. 260—453)

This invention is directed to a novel method of preparing diisocyanates of the general formula

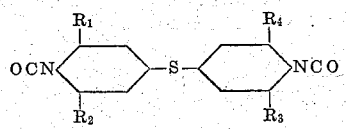

where the R's are hydrogen, lower alkyl or halogen, which method comprises reacting an appropriate aryl isocyanate with sulfur dichloride.

It is an object of this invention to provide a unique and direct method of preparing symmetrical diaryl diisocyanates.

These and other objects will become apparent in the following description and claims.

More specifically, the present invention is directed to a process for preparing 4,4'-diisocyanatodiaryl sulfides which process comprises heating together (1) a compound selected from the group consisting of (a) an aryl isocyanate of the formula

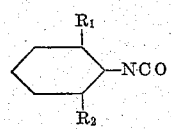

and (b) a carbamyl chloride of the structure

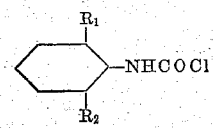

wherein $R_1$ and $R_2$ of (a) and (b) are hydrogen, halogen or lower alkyl, and, (2) a reactant providing a —S— linkage, said reactant comprising a mixture of sulfur dichloride, sulfur monochloride and chlorine, at a temperature within the range of about 75° to about 150° C. in the presence of a Friedel-Crafts catalyst and recovering said diisocyanatodiaryl sulfide from the reaction mass.

The mixture of sulfur chlorides and chlorine may be described as a sulfur chloride composition corresponding to a sulfur:chlorine ratio between 1:1 and 1:2.2. This corresponds to sulfur monochloride at 1:1 and sulfur monochloride (in equilibrium with sulfur dichloride) with a 20% excess of chlorine over that required to give sulfur dichloride. The range is thus (where X=0–2):

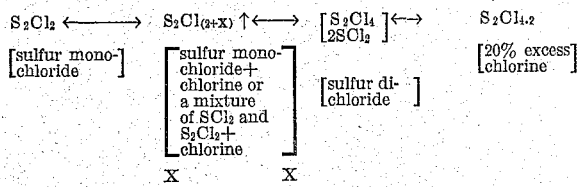

It is essential, according to the present invention, that the 4-position in the starting isocyanate be free. Substituents in the 2- and 6-positions are permissible; such substituents, however, should not be of the kind which inhibit the activity of the 4-position in the ring. Representative substituents which may be present in the 2- and 6-positions include halogen, lower alkyl and alkoxy substituents. Representative examples of such isocyanates include o-chlorophenyl isocyanate, o-tolyl isocyanate, 2,6-ditertiary butyl phenyl isocyanate, 2,6-dimethylphenyl isocyanate, o-bromophenyl isocyanate and 2,6-dichlorophenyl isocyanate.

Similarly, the corresponding carbamyl chlorides may be used. Representative examples are o-chlorophenyl carbamyl chloride, o-tolyl carbamyl chloride, 2,6-dichlorophenyl carbamyl chloride, o-methoxyphenyl carbamyl chloride, 2,6-ditertiary butyl phenyl carbamyl chloride.

It is a matter of general knowledge in the isocyanate field that the reaction of the isocyanato group with hydrogen chloride is reversible,

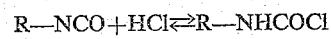

$$R\text{—}NCO + HCl \rightleftarrows R\text{—}NHCOCl$$

and can be driven to the right by adding HCl and keeping the temperature below the decomposition point of the carbamyl chloride. Conversely, it can be driven to the left by heating above the decomposition point of the carbamyl chloride and removing HCl. Since the reaction with $SCl_2$ generates HCl, it is apparent that the reactant and product probably exist in both the isocyanato and carbamyl chloride state during the reaction.

When the aryl carbamyl chloride is used as the sole starting reactant with the sulfur dichloride, it is necessary to use an inert suspending medium since the carbamyl chlorides are normally solids. Inert media suitable for use include the chlorinated aromatic hydrocarbons such as chlorobenzene, o-dichlorobenzene, higher boiling hydrocarbons such as toluene and xylene and the like, and chlorinated aliphatic hydrocarbons such as tetrachloroethane.

By Friedel-Crafts catalyst is meant those halide containing catalysts generally used for alkylating aromatic rings as described in all organic texts. These catalysts are believed to complex the negative chloride ion. Illustrative representative catalysts include: Aluminum chloride ($AlCl_3$), zinc chloride ($ZnCl_2$), antimony pentachloride ($SbCl_5$), stannic chloride ($SnCl_4$), iodine ($I_2$), titanium tetrachloride ($TiCl_4$) and zirconium tetrachloride ($ZnCl_4$). The complex is believed to exist in the form such as $Al(Cl_4)^-$. However, regardless of the theory, this type of catalyst is necessary. Alkylation catalysts such as sulfuric acid are not operable.

In the absence of any catalyst, there is no reaction between an aryl isocyanate or aryl carbamyl chloride and sulfur dichloride.

The temperature range of 75° to 150° C. represents a practical operating range. Below about 75° C. the reaction proceeds so slowly that unduly long times are required for reasonable conversion. Above about 150° C. there exists the danger of decomposition of the diisocyanate, particularly if the reaction is prolonged. Certain of the catalysts will permit the use of lower temperatures in achieving equal reaction rates than will others. It is within the skill of the chemist to select the catalyst and temperature to give him the maximum yield of the specific diisocyanatodiaryl sulfide.

Sulfur dichloride, $SCl_2$, is the preferred reagent in this reaction and has given the best yields of diisocyanatodiaryl sulfides. However, sulfur dichloride does not normally exist in the pure state and is considered to exist ordinarily in equilibrium

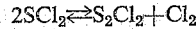

$$2SCl_2 \rightleftarrows S_2Cl_2 + Cl_2$$

Thus any particular quantity of sulfur dichloride is actually composed of all three products. Since chlorine can escape as a gas the gross composition can vary between $SCl_2$ and $S_2Cl_{(2+x)}$ where X is some value between 0 and 2. The reaction may be carried out using sulfur monochloride, S₂Cl₂ (or as sometimes called, disulfur dichloride), containing dissolved chlorine. For optimum results a molar equivalent of chlorine should be used with the S₂Cl₂. In practice, to assure this, an excess of 10–20% chlorine may be used (a sulfur:chlorine ratio of S:Cl of 1:2.1–1:2.2). When a deficiency of chlorine is used, it has been noticed that the yield of diisocyanatodiaryl sulfide decreases and a by-product tar is formed in increasing amounts, although S₂Cl₂ used without added chlorine will react with the aryl isocyanates to give the diisocyanatodiaryl sulfides. In the case of phenyl isocyanate a yield of 20% 4,4'-diisocyanatodiphenyl sulfide was obtained. A sulfur chloride composition in which the molar ratio of sulfur to chlorine is 1:2 is the preferred reactant.

Representative examples illustrating the present invention are as follows.

*Example 1*

200 parts of phenyl isocyanate was placed in a reaction vessel equipped with an agitator, a reflux condenser, and an addition funnel and then blanketed with nitrogen. 86.5 parts of sulfur dichloride (atomic ratio of S:Cl=1:2) was placed in the addition funnel. The phenyl isocyanate was heated until it began to reflux gently at about 160° C. The sulfur dichloride was then added slowly and the temperature dropped gradually to about 132° C. No evolution of hydrogen chloride occurred. The addition of sulfur dichloride was then stopped, the flask was cooled to 115° C. and 1 part of anhydrous zinc chloride was added. Agitation and heating were then resumed. Reaction was noticeable at 130° C. and the temperature rose rapidly to 145° C. The reaction mass was cooled to 130° C. and the balance of the sulfur dichloride was added gradually over a 20-minute period while maintaining the temperature at about 130° C. After the sulfur dichloride addition was complete, the reaction mass was heated to 175° C. for 30 minutes and then cooled. The mass was then distilled under vacuum. Unreacted phenyl isocyanate and by-product p-chlorophenyl isocyanate distilled over first and then 40 parts of 4,4'-diisocyanatodiphenyl sulfide was obtained distilling at 175° C. and 1 mm. of mercury pressure.

When the experiment was repeated except that 2 parts of iodine was used instead of the 1 part of zinc chloride, the reaction proceeded more slowly and yielded 97 parts of 4,4'-diisocyanatodiphenyl sulfide.

*Example 2*

165 parts of sulfur dichloride (atomic ratio S:Cl=1:2) was added gradually over a period of 1 hour to 570 parts of phenyl isocyanate and 1 part of anhydrous zinc chloride under an atmosphere of nitrogen while agitating at 100–105° C. After the addition of sulfur dichloride was complete, the reaction mass was stirred a further 1.5 hours at 100–105° C. The temperature was lowered, 180 parts of dry benzene was added, and then the mixture was heated to reflux for 6 hours to eliminate hydrogen chloride. The mixture was cooled somewhat, 230 parts of dry benzene was added and then cooling continued while stirring to 20° C. The mass was filtered and the filtrate was distilled, the benzene being removed first at normal pressure and 251 parts of 4,4'-diisocyanatodiphenyl sulfide being obtained at 175° C. at 1 mm. of mercury pressure.

When the above experiment was repeated except that the reaction temperature was maintained at 70–85° C., the yield of 4,4'-diisocyanatodiphenyl sulfide was 110 parts and about twice as much by-product p-chlorophenyl isocyanate was obtained.

In the preceding examples, any of the heretofore described representative starting isocyanates may be utilized with any of the Friedel-Crafts catalysts heretofore specifically described as well as those generally utilized for alkylating aromatic rings, to give substantially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process of preparing 4,4'-diisocyanatodiphenyl sulfides, which process comprises heating an aryl isocyanate of the formula

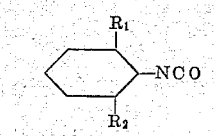

wherein R₁ and R₂ are selected from the group consisting of hydrogen, halogen and lower alkyl radicals, and a reactant mixture of sulfur dichloride, sulfur monochloride and chlorine, said heating being at a temperature within the range of about 75° to about 150° C., said process being conducted in the presence of a Friedel-Crafts catalyst, followed by recovering the resulting diisocyanatodiaryl sulfide from the reaction mixture.

2. The process of claim 1 wherein the aryl isocyanate is phenyl isocyanate.

3. A process of preparing 4,4'-diisocyanatodiphenyl sulfides, which process comprises heating a carbamyl chloride of the structure

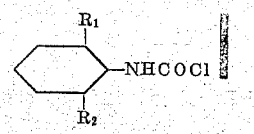

wherein R₁ and R₂ are selected from the group consisting of hydrogen, halogen and lower alkyl radicals, and a reactant mixture of sulfur dichloride, sulfur monochloride and chlorine, said heating being at a temperature within the range of about 75° to about 150° C., said process being conducted in the presence of a Friedel-Crafts catalyst and an inert solvent, followed by recovering the resulting diisocyanatodiaryl sulfide from the reaction mixture.

References Cited in the file of this patent

Thomas: "Anhydrous Aluminum Chloride in Organic Chemistry," 1941, pages 163 to 165.